(12) United States Patent
Bilra et al.

(10) Patent No.: US 12,743,394 B2
(45) Date of Patent: Sep. 22, 2026

(54) COMMUNICATION METHOD FOR A COMMUNICATION NETWORK OF A VEHICLE AND COMMUNICATION NETWORK

(71) Applicant: Bayerische Motoren Werke Aktiengesellschaft, Munich (DE)

(72) Inventors: Manjeet Singh Bilra, Hoerlkofen (DE); Mohamed-Saad Abdelhameed, Dachau (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 18/725,691

(22) PCT Filed: Nov. 23, 2022

(86) PCT No.: PCT/EP2022/082938
§ 371 (c)(1),
(2) Date: Jun. 28, 2024

(87) PCT Pub. No.: WO2023/134911
PCT Pub. Date: Jul. 20, 2023

(65) Prior Publication Data

US 2025/0173303 A1 May 29, 2025

(30) Foreign Application Priority Data

Jan. 13, 2022 (EP) .................................... 22151442

(51) Int. Cl.
*G06F 13/42* (2006.01)

(52) U.S. Cl.
CPC .. *G06F 13/4282* (2013.01); *G06F 2213/0012* (2013.01)

(58) Field of Classification Search
CPC ............. G06F 13/4282; G06F 13/4291; G06F 13/4295; G06F 2213/0012; H04L 43/024; H04L 43/0847
See application file for complete search history.

(56) References Cited

U.S. PATENT DOCUMENTS

2008/0126610 A1* 5/2008 He ........................ H04L 7/0008 710/30
2013/0064321 A1* 3/2013 Kopp ................. G06F 13/4282 375/295
(Continued)

FOREIGN PATENT DOCUMENTS

CN 204695305 U 10/2015
EP 2 570 931 A1 3/2013
(Continued)

OTHER PUBLICATIONS

International Search Report (PCT/ISA/210) issued in PCT Application No. PCT/EP2022/082938 dated Feb. 17, 2023 (3 pages).
(Continued)

*Primary Examiner* — Phong H Dang
(74) *Attorney, Agent, or Firm* — Crowell & Moring LLP

(57) ABSTRACT

A communication method for a communication network of a vehicle includes a master data processing unit and a slave data processing unit connected to the master data processing unit via a synchronous serial communication interface. The slave data processing unit is connected to the master data processing unit via a slave select line for indicating that data is being sent from the master data processing unit to the slave data processing unit. The data sent from the master data processing unit to the slave data processing unit and/or from the slave data processing unit to the master data processing unit is framed by a start bit as a first bit and a stop bit as a last bit of the sent data.

15 Claims, 3 Drawing Sheets

(56) References Cited

U.S. PATENT DOCUMENTS

2014/0359179 A1* 12/2014 Aue ........................ G06F 13/42
710/106
2018/0309542 A1* 10/2018 Austin ...................... H04L 1/14
2019/0391935 A1* 12/2019 Zhong ..................... G06F 13/10
2022/0075754 A1* 3/2022 Ongyanco ........... G06F 11/3027
2022/0327091 A1* 10/2022 Wise ................... G06F 13/4282
2024/0163141 A1* 5/2024 Nagao ..................... H04L 25/40

FOREIGN PATENT DOCUMENTS

KR 10-2016-0148232 A 12/2016
WO WO 2021/048356 A1 3/2021

OTHER PUBLICATIONS

Anonymous et al., "Application Note on SPI Communication using UART", URL: http://www.fujitsu.com/downloads/MICRO/fma/pdfmcu/SPICommunicationUsingUART.pdf, Nov. 12, 2010, XP055021449 (7 pages).

Korean-language Office Action issued in Korean Application No. 10-2024-7026081 dated Mar. 24, 2026 with English translation (18 pages).

* cited by examiner

COMMUNICATION METHOD FOR A COMMUNICATION NETWORK OF A VEHICLE AND COMMUNICATION NETWORK

CROSS REFERENCE TO RELATED APPLICATION

This application is a 371 of International Application No. PCT/EP2022/082938, filed Nov. 23, 2022 which claims priority under 35 U.S.C. § 119 from European Patent Application No. 22151442.5, filed Jan. 13, 2022, the entire disclosure of which is herein expressly incorporated by reference.

The present disclosure is directed to a communication method for a vehicle and a communication configured to carry out the method at least partly. An, optionally automated, vehicle comprising the communication network may be provided.

A System on Chip or System on a Chip (SoC) is a highly advanced microcontroller with limited ports using SPI (Serial Peripheral Interface) Protocols for communication for high priority tasks.

One problem of the state of the art is that, in case these ports are used for heartbeat monitoring, there might be the case that other higher priority tasks could not be executed using these ports or exert heavy CPU (Central Processing Unit) load. That is, one problem of the state of the art is that monitoring of different slave SoCs via one monitoring SoC requires a significant number of monitoring ports at the monitoring SoC when using communication protocols such as SPI. This also exerts more CPU load on the monitoring SoC and might cause delays in data processing and/or cross communication between ports or even a short circuit between physical pins/ports of the monitoring SoC.

In the light of this prior art, the object of the present disclosure is to provide a device and/or a method being suitable for overcoming at least the above-mentioned disadvantage of the prior art, respectively.

The object is solved by the features of the independent claims. The dependent claims have preferred further embodiments of the disclosure as their subject matter.

More specifically, the object is solved by a communication method for a communication network of a vehicle, wherein the network comprises a master data processing unit, and a slave data processing unit being connected to the master data processing unit via a synchronous serial communication interface. The slave data processing unit may be connected to the master data processing unit via a slave select line for indicating that data is being sent from the master data processing unit to the slave data processing unit.

The master and/or the slave data processing unit may be or comprise a SoC. A SoC is an integrated circuit (also known as a "chip") that integrates all or most components of a computer or other electronic systems. These components may include a central processing unit (CPU), a memory, input/output ports and a secondary storage, optionally alongside other components such as a graphics processing unit (GPU)—all on a single substrate or microchip. An Soc may contain digital, analog, mixed-signal, and/or radio frequency signal processing functions. SoCs are in contrast to the common traditional motherboard-based PC architecture, which separates components based on function and connects them through a central interfacing circuit board. Whereas a motherboard houses and connects detachable or replaceable components, SoCs integrate all of these components into a single integrated circuit.

According to the method, data sent from the master data processing unit to the slave data processing unit and/or from the slave data processing unit to the master data processing unit is framed by a start bit as a first bit and a stop bit as a last bit of the sent data. Here the data (frame) sent during one cycle may have a fixed length, e.g., 8 bits (i.e., a byte), 10 bits, 12 bits or 16 bits.

More specifically, the master and the slave data processing unit may be SPI devices wherein SPI is a synchronous serial communication interface specification used for short-distance communication, primarily in embedded systems. SPI devices may communicate in full duplex mode using a master-slave architecture usually with a single master. The master (controller/data processing) device originates the frame for reading and writing. Multiple slave-devices may be supported through selection with individual chip select (CS) or slave select (SS) lines. In the independent slave configuration, there is an independent chip select line for each slave. The master asserts only one chip select at a time. Some products that implement SPI may be connected in a daisy chain configuration, the first slave output being connected to the second slave input, etc. The SPI port of each slave is designed to send out during the second group of clock pulses an exact copy of the data it received during the first group of clock pulses. The whole chain acts as a communication shift register; daisy chaining is often done with shift registers to provide a bank of inputs or outputs through SPI. Each slave copies input to output in the next clock cycle until active low SS line goes high. Such a feature only requires a single SS line from the master, rather than a separate SS line for each slave. Both configurations are possible here.

As a synchronous serial communication interface, SPI does not use start and stop bits to indicate a start and an end of sending data, but uses the slave select line to select a respective one of the slaves connect to the master. However, start and stop bits are used when using a universal asynchronous receiver-transmitter (UART) device which is a computer hardware device for asynchronous serial communication in which the data format and transmission speeds are configurable. UART sends data bits one by one, from the least significant to the most significant, framed by start and stop bits so that precise timing is handled by the communication channel. A related device, the universal synchronous and asynchronous receiver-transmitter (USART) which also supports synchronous operation, may also be provided here.

However, by adding the start and the stop bit to each data (frame or packet) sent using synchronous communication (e.g., SPI), an interconnectivity between a device using asynchronous communication (e.g., the UART) and the master and the slave data processing device can be provided.

More specifically, normally the UART takes bytes of data and transmits the individual bits in a sequential fashion. At the destination, a second UART re-assembles the bits into complete bytes. Each UART contains a shift register, which is the fundamental method of conversion between serial and parallel forms. Serial transmission of digital information (bits) through a single wire or other medium is less costly than parallel transmission through multiple wires. Communication may be simplex (in one direction only, with no provision for the receiving device to send information back to the transmitting device), full duplex (both devices send and receive at the same time) or half duplex (devices take turns transmitting and receiving). In UART the idle, no data state is high-voltage, or powered. Each character/data packet is framed as a logic low start bit, data bits, possibly a parity bit and one or more stop bits. The start bit signals the receiver that a new character is coming. The next optionally five to nine bits, depending on the code set employed, represent the character. If a parity bit is used, it would be placed after all of the data bits. The next one or two bits are always in the mark (logic high, i.e., '1') condition and called the stop bit(s). They signal to the receiver that the character is complete. Since the start bit is logic low (i.e., 0) and the stop bit is logic high (i.e., 1) there are always at least two guaranteed signal changes between characters.

In the present case, the sending device is not a UART but an SPI device simulating the start and the stop bit such that an UART can identify the start and the end of the transmitted data. Therefore, the start and the stop bit may be called dummy bits.

UART has the advantage that only one wire for simplex and two wires for duplex data transmission (and ground) are needed, whereas SPI requires four wires. Therefore, the number of wires and thus pins needed at a receiving device is reduced according to the method.

In the following the above-described method is described in more detail.

The slave data processing unit may be connected to the master data processing unit via a serial clock line for synchronizing a sampling time of the master data processing unit and a sampling time of the slave data processing unit, and a master-out-slave-in data line for data output from the master data processing unit to the slave data processing unit.

Here, sampling is the reduction of a continuous-time signal (i.e., the data transmitted via MOSI and/or MSIO) received at the respective device to a discrete-time signal. The sampling time is the point or points time at which a sample(s) is/are taken from the continuous-time signal at the receiver. The original (continuous-time) signal may be retrievable from a sequence of samples, up to the Nyquist limit, by passing the sequence of samples through a type of low pass filter called a reconstruction filter.

The method may comprise indicating that the data is being sent from the master data processing unit to the slave data processing unit using the slave select line, e.g., pulling the slave select line from high to low.

The method may comprise synchronizing the sampling time of the master data processing unit to the sampling time of the slave data processing unit using the serial clock line after and/or during indicating that the data is being sent from the master data processing unit to the slave data processing unit.

The method may comprise sending the data from the master data processing unit to the slave data processing unit using the master-out-slave-in data line (i.e., MOSI) after and/or during synchronizing the sampling time of the master data processing unit to the sampling time of the slave data processing unit.

The slave data processing unit may be connected to the master data processing unit via a master-in-slave-out data line (i.e., MISO) for data output from the slave data processing unit to the master data processing unit.

The method may comprise sending data from the slave data processing unit to the master data processing unit using the master-in-slave-out data line after and/or during synchronizing the sampling time of the master data processing unit to the sampling time of the slave data processing unit.

More specifically, in case of SPI, to begin communication, the (bus) master may configure the clock, using a frequency supported by the slave device, typically up to a few MHz. The master then may select the slave device with a logic level 0 on the select line, as described above. If a waiting period is required, such as for an analog-to-digital conversion, the master may wait for at least that period of time before issuing clock cycles.

During each SPI clock cycle, a full-duplex data transmission may occur. The master may send a bit on the MOSI line and the slave may read it, while the slave may send a bit on the MISO line and the master may read it. This sequence is maintained even when only one-directional data transfer is intended.

Transmissions using SPI normally involve two shift registers of some given word-size, such as eight bits, one in the master and one in the slave; they are connected in a virtual ring topology. Data is usually shifted out with the most significant bit first. On the clock edge, both master and slave may shift out a bit and output it on the transmission line (i.e, MISO and MOSI) to the counterpart. On the next clock edge, at each receiver the bit may be sampled from the transmission line and may be set as a new least-significant bit of the respective shift register. After the shift register bits have been shifted out and in, the master and slave have exchanged register values. If more data needs to be exchanged, the shift registers may be reloaded and the process repeats. In the present case, the respective shift registers are loaded with a start bit as the most-significant bit and the stop bit as the least significant bit, optionally in each cycle. Transmission may continue for any number of clock cycles. When complete, the master stops toggling the clock signal, and typically deselects the slave using the slave select line.

The network may comprise a monitoring data processing unit comprising an asynchronous serial communication interface, wherein the monitoring data processing unit may be connected via the asynchronous serial communication interface to the master data processing unit and the slave data processing unit.

According to the method, the monitoring device may recognize a beginning of the sent data using the start bit and an end of the sent data using the stop bit.

That is, the monitoring device may comprise a UART acting as a (second) receiver for the signals sent from the master to the slave and/or vice versa.

More specifically, the monitoring data processing unit may be connected to the master-out-slave-in data line.

According to the method, the monitoring device may recognize the beginning of the data sent from the master data processing unit to the slave data processing unit via the master-out-slave-in data line using the start bit and the end of the data sent from the master data processing unit to the slave data processing unit via the master-out-slave-in data line using the stop bit.

Additionally or alternatively, the monitoring data processing unit may be connected to the master-in-slave-out data line.

According to the method, the monitoring device may recognize the beginning of the data sent from the slave data processing unit to the master data processing unit via the master-in-slave-out data line using the start bit and the end of the data sent from the slave data processing unit to the master data processing unit via the master-in-slave-out data line using the stop bit.

More specifically and with respect to UART, all operations of the UART hardware may be controlled by an internal clock signal which runs at a multiple of the data rate used for sending the data, typically 8 or 16 times the bit rate. The receiver, here the monitoring device, may test the state of the incoming signal on each clock pulse, looking for the beginning of the start bit. If the apparent start bit lasts at least one-half of the bit time, it may be valid and signal the start of a new character. If not, it may be considered a spurious pulse and may be ignored. After waiting a further bit time, the state of the line may be again sampled and the resulting level clocked into a shift register. After the required number of bit periods for the character length (5 to 8 bits, typically, as described above) have elapsed, the contents of the shift register may made available (in parallel fashion) to the receiving system. The UART may set a flag indicating new data is available, and may also generate a processor interrupt to request that the host processor transfers the received data.

Communicating UARTs have no shared timing system apart from the communication signal. Typically, UARTs resynchronize their internal clocks on each change of the data line that is not considered a spurious pulse. Obtaining timing information in this manner, they reliably receive when the transmitter is sending at a slightly different speed than it should. Simplistic UARTs do not do this; instead they resynchronize on the falling edge of the start bit only, and then read the center of each expected data bit, and this system works if the broadcast data rate is accurate enough to allow the stop bits to be sampled reliably. Here, both options are possible.

However, since the UART does not get the clock signal from the master data processing device, the UART must know the bit rate used by the master and the slave such that it correctly samples the data, i.e., the master, the slave and the UART of the monitoring system need to have substantially the same sampling rate.

The monitoring device may sample the data with the same sampling time as the master data processing unit and the slave data processing unit.

The monitoring device may carry out automatic baud rate detection (ABR). ABR may refer to the process by which a receiving device (here the monitoring device) determines the speed, code level, start bit, and stop bits of incoming data by examining the first character, usually a preselected sign-on character (syncword) on a UART connection. ABR allows the receiving device to accept data from a variety of transmitting devices operating at different speeds without needing to establish data rates in advance.

Moreover, the monitoring device may store the most recent character while receiving the next. This "double buffering" gives a receiving computer an entire character transmission time to fetch a received character. The monitoring device may have a small first-in, first-out (FIFO) buffer memory between the receiver shift register and the host system interface. This allows the host processor even more time to handle an interrupt from the UART and prevents loss of received data at high rates.

The monitoring device may be called safety device. The monitoring device and the master data processing unit may be on the same or on a different SoC.

The above-described method may be summarized in other words and with respect to a more concrete implementation thereof as follows.

The background of disclosure is to create a monitoring system using the UART (Universal Asynchronous Receiver-Transmitter) communication protocol instead of the SPI (Serial Peripheral Interface) protocol, e.g., in heartbeat monitoring, to ensure safety integrity of a safety critical system such as a System on Chip (SoC).

Safety integrity may be defined using the Automotive Safety Integrity Level (ASIL) which is a standardized risk classification scheme defined by the ISO 26262-Functional Safety for Road Vehicles standard. This is an adaptation of the Safety Integrity Level (SIL) used in IEC 61508 for the automotive industry. This classification helps defining the safety requirements necessary to be in line with the ISO 26262 standard. The ASIL is established by performing a risk analysis of a potential hazard by looking at the Severity, Exposure and Controllability of the vehicle operating scenario. The safety goal for that hazard in turn carries the ASIL requirements. There are four ASILs identified by the standard: ASIL A, ASIL B, ASIL C, ASIL D. ASIL D dictates the highest integrity requirements on the device/method and ASIL A the lowest. Hazards that are identified as QM do not dictate any safety requirements.

The disclosure takes into consideration that there may be multiple slave SoCs which could be monitored by one master SoC and/or one separate monitoring/safety SoC.

The master/safety SoC may be developed according to ASIL and provide different monitoring mechanisms such as CRC, timeout and heartbeat monitoring to ensure high availability.

According to the state of the art, the safety SoC monitors the heartbeat of the slaves using the SPI (Serial Peripheral Interface) communication protocol with given ports. However, according to the present disclosure, the safety SoC may use the UART (Universal Asynchronous Receiver-Transmitter) communication protocol.

The UART Protocol is an asynchronous serial communication protocol with configurable speed. Asynchronous means there is no clock signal to synchronize the output bits from the transmitting device to the receiving end of UART. Hence, the data is sent serially from transmitting UART to receiving UART.

The safety SoC may only have one UART port per slave. The Port may be configured to only receive the information from each respective slave transmission port.

The UART communication protocol may be modified to ensure similar data packet capability as that of the SPI communication protocol.

The SPI communication protocol may be modified to create the UART packet using start bit, data Frame and stop bit(s). Here the UART packet may be configured so that the start bit is low (i.e., 0) and the stop bit and bus idle are high (i.e., 1). The stop bit may comprise one, 1.5 or more bits. A parity bit in front of the stop bit may or may not be used.

The safety SoC could also be a grand master with multiple SoCs in master and slave SoC configuration.

The master and slave SoC may communicate with each other using 'MOST' and 'MISO'. The grand master safety SoC may monitor, with ASIL, the heartbeat using UART 'RX' directly reading 'MOST' and 'MISO' of master and slave SoC.

The Communication between the master and the slave SC and to the grandmaster safety SoC may be protected with end-to-end (E2E) protection such as a cyclic redundancy check (CRC) to ensure that no corruption of the data frame of the data packet happened.

It may be ensured that the reading of bits in the data frame of the UART has the same frequency/baud rate as that of the SPI protocol, i.e., the same sampling time may be used.

Moreover, a communication network for a vehicle is provided. The communication network may be configured to carry out the above-described method at least partly.

The network comprises a master data processing unit, and a slave data processing unit being connected to the master data processing unit via a synchronous serial communication interface.

The slave data processing unit is connected to the master data processing unit via a slave select line for indicating that data is being sent from the master data processing unit to the slave data processing unit.

The master data processing unit is configured to frame data sent from the master data processing unit to the slave data processing unit with a start bit as a first bit and a stop bit as a last bit of the sent data.

Additionally or alternatively, the slave data processing unit is configured to frame data sent from the slave data processing unit to the master data processing unit with a start bit as a first bit and a stop bit as a last bit of the sent data.

In the following the above described communication network is described in more detail.

The slave data processing unit may be connected to the master data processing unit via a serial clock line for synchronizing a sampling time of the master data processing unit and a sampling time of the slave data processing unit, and a master-out-slave-in data line for data output from the master data processing unit to the slave data processing unit.

The master data processing unit may be configured to indicate that the data is being sent from the master data processing unit to the slave data processing unit using the slave select line.

The master data processing unit may be configured to synchronize the sampling time (i.e., the time at which the respective unit samples/reads the signal received from via the data line) of the master data processing unit to the sampling time of the slave data processing unit using the serial clock line after and/or during indicating that the data is being sent from the master data processing unit to the slave data processing unit.

The master data processing unit may be configured to send the data from the master data processing unit to the slave data processing unit using the master-out-slave-in data line after and/or during synchronizing the sampling time of the master data processing unit to the sampling time of the slave data processing unit.

Additionally or alternatively, the slave data processing unit may be connected to the master data processing unit via a master-in-slave-out data line for data output from the slave data processing unit to the master data processing unit.

The slave data processing unit may be configured to send data from the slave data processing unit to the master data processing unit using the master-in-slave-out data line after and/or during synchronizing the sampling time of the master data processing unit to the sampling time of the slave data processing unit.

The network may comprise a monitoring data processing unit comprising an asynchronous serial communication interface, wherein the monitoring data processing unit is connected via the asynchronous serial communication interface to the master data processing unit and the slave data processing unit.

The monitoring device may be configured to recognize a beginning of the sent data using the start bit and an end of the sent data using the stop bit.

The monitoring data processing unit may be connected to the master-out-slave-in data line.

The monitoring device may be configured to recognize the beginning of the data sent from the master data processing unit to the slave data processing unit via the master-out-slave-in data line using the start bit and the end of the data sent from the master data processing unit to the slave data processing unit via the master-out-slave-in data line using the stop bit.

Additionally or alternatively, the monitoring data processing unit may be connected to the master-in-slave-out data line.

The monitoring device may be configured to recognize the beginning of the data sent from the slave data processing unit to the master data processing unit via the master-in-slave-out data line using the start bit and the end of the data sent from the slave data processing unit to the master data processing unit via the master-in-slave-out data line using the stop bit.

The monitoring device may be configured to sample the data with the same sampling time as the master data processing unit and the slave data processing unit.

The communication network can comprise an electronic control unit (ECU) and/or a SoC for a vehicle, as a master, slave and/or monitoring data processing unit. The data processing unit can be an (intelligent) processor-controlled unit that can, optionally, communicate with other modules, optionally via a central gateway (CGW). The data processing unit can form part of the vehicle's onboard network comprising fieldbuses such as CAN bus, LIN bus, MOST bus and/or FlexRay or automotive Ethernet, optionally together with a telematics control unit. The data processing unit(s) may be configured to control functions relevant to a driving behavior of the vehicle, such as an engine control system, a power transmission, a braking system and/or a tire pressure control system. In addition, some or all driver assistance systems such as parking assistant, adaptive cruise control, lane departure warning, lane change assistant, traffic sign recognition, light signal recognition, approach assistant, night vision assistant, intersection assistant, and/or many others may be controlled by the data processing unit(s).

Moreover, the description given above with respect to the method applies mutatis mutandis to the network and vice versa.

Furthermore, a vehicle is provided. The vehicle comprises the above-described data communication network.

The vehicle may be an automobile, e.g., a car. The vehicle may be automated. The automated vehicle can be designed to take over lateral and/or longitudinal guidance at least partially and/or temporarily during automated driving of the automated vehicle. Therefore, inter alia the sensor/camera data of the above-described sensor system/camera may be used. The control unit may be configured to control the automated driving at least partly.

The automated driving may be such that the driving of the vehicle is (largely) autonomous. The vehicle may be a vehicle of autonomy level 1, i.e., have certain driver assistance systems that support the driver in vehicle operation, for example adaptive cruise control (ACC).

The vehicle can be a vehicle of autonomy level 2, i.e., be partially automated in such a way that functions such as automatic parking, lane keeping or lateral guidance, general longitudinal guidance, acceleration and/or braking are performed by driver assistance systems.

The vehicle may be an autonomy level 3 vehicle, i.e., automated in such a conditional manner that the driver does not need to continuously monitor the system vehicle. The vehicle autonomously performs functions such as triggering the turn signal, changing lanes, and/or lane keeping. The driver can attend to other matters, but is prompted by the system to take over control within a warning time if needed.

The vehicle may be an autonomy level 4 vehicle, i.e., so highly automated that the driving of the vehicle is permanently taken over by the system vehicle. If the driving tasks are no longer handled by the system, the driver may be requested to take over control.

The vehicle may be an autonomy level 5 vehicle, i.e., so fully automated that the driver is not required to complete the driving task. No human intervention is required other than setting the destination and starting the system. The vehicle can operate without a steering wheel or pedals.

Moreover, the description given above with respect to the method and the network applies mutatis mutandis to the vehicle and vice versa.

Furthermore, a computer program comprising instructions which, when the program is executed by a computer, optionally the data processing unit(s), cause the computer to carry out the above-described method at least partly.

The program may comprise any program code, in particular a code suitable for control systems of vehicles. The description given above with respect to the method, the control unit and the vehicle applies mutatis mutandis to the computer program and vice versa.

Furthermore, a computer-readable medium comprising instructions which, when executed by a computer, cause the computer to carry out the above-described method at least partly.

The computer-readable medium may be any digital data storage device, such as a USB flash drive, a hard disk, a CD-ROM, an SD card or an SSD card. The above-described computer program may be stored on the computer-readable medium. However, the computer program does not necessarily have to be stored on such a computer-readable medium, but can also be obtained via the Internet.

Moreover, the description given above with respect to the method, the control unit, the vehicle, and the computer program applies mutatis mutandis to the computer-readable (storage) medium and vice versa.

At least one embodiment is described with reference to figures.

DETAILED DESCRIPTION OF THE DRAWINGS

In the following at least one embodiment is described with reference to FIGS. 1 to 4, wherein the same reference signs are used for the same objects throughout the description of the figures and wherein the embodiment is just one specific example for implementing the disclosure and does not limit the scope of the disclosure as defined by the claims.

Figures 3, 4:
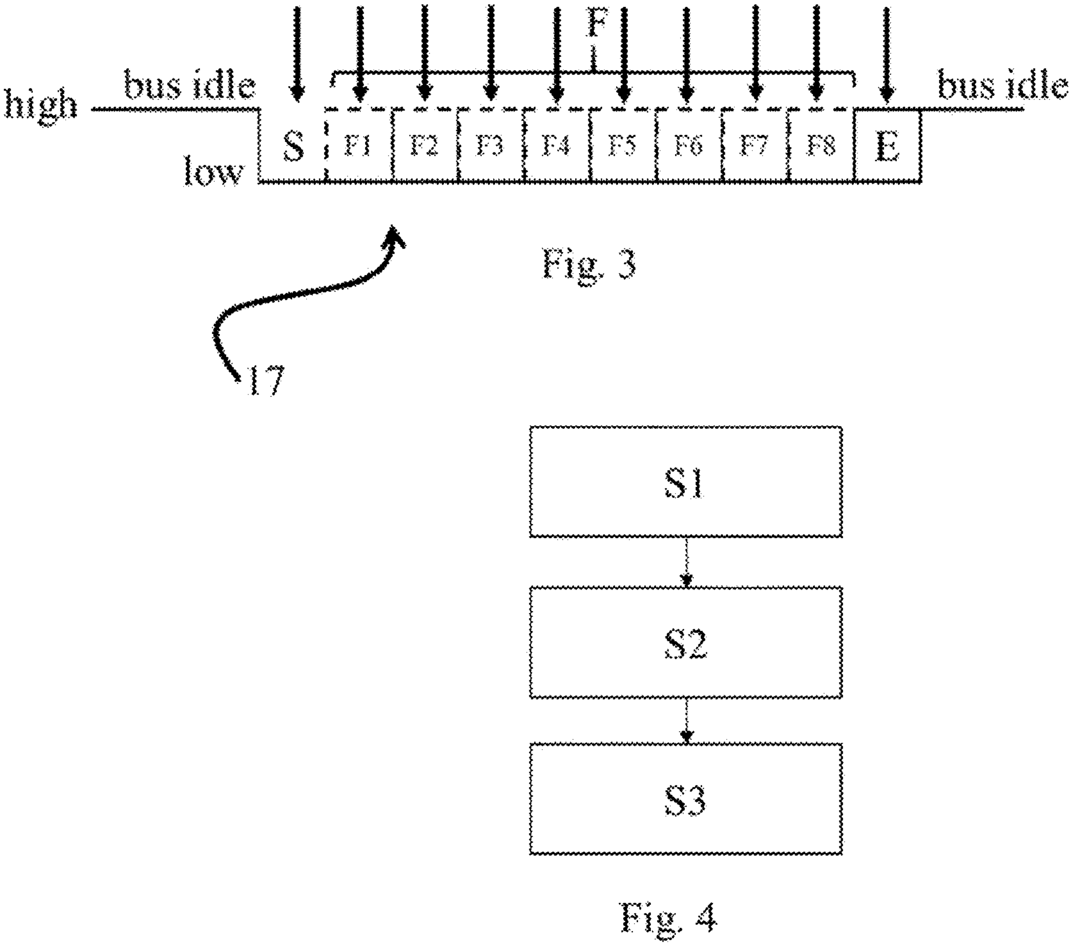
FIG. 3 shows schematically a communication protocol used for communication between the master and the monitoring data processing unit in the network of FIG. 2.
FIG. 4 shows a flowchart of a communication method used in the communication network of FIG. 2.

The flowchart of FIG. 4 should not be interpreted as showing a strict order of the steps S1-S3 of the method, but the steps S1-S3 may be carried out in any technically reasonable order (e.g., at least partly simultaneously).

Figure 1:
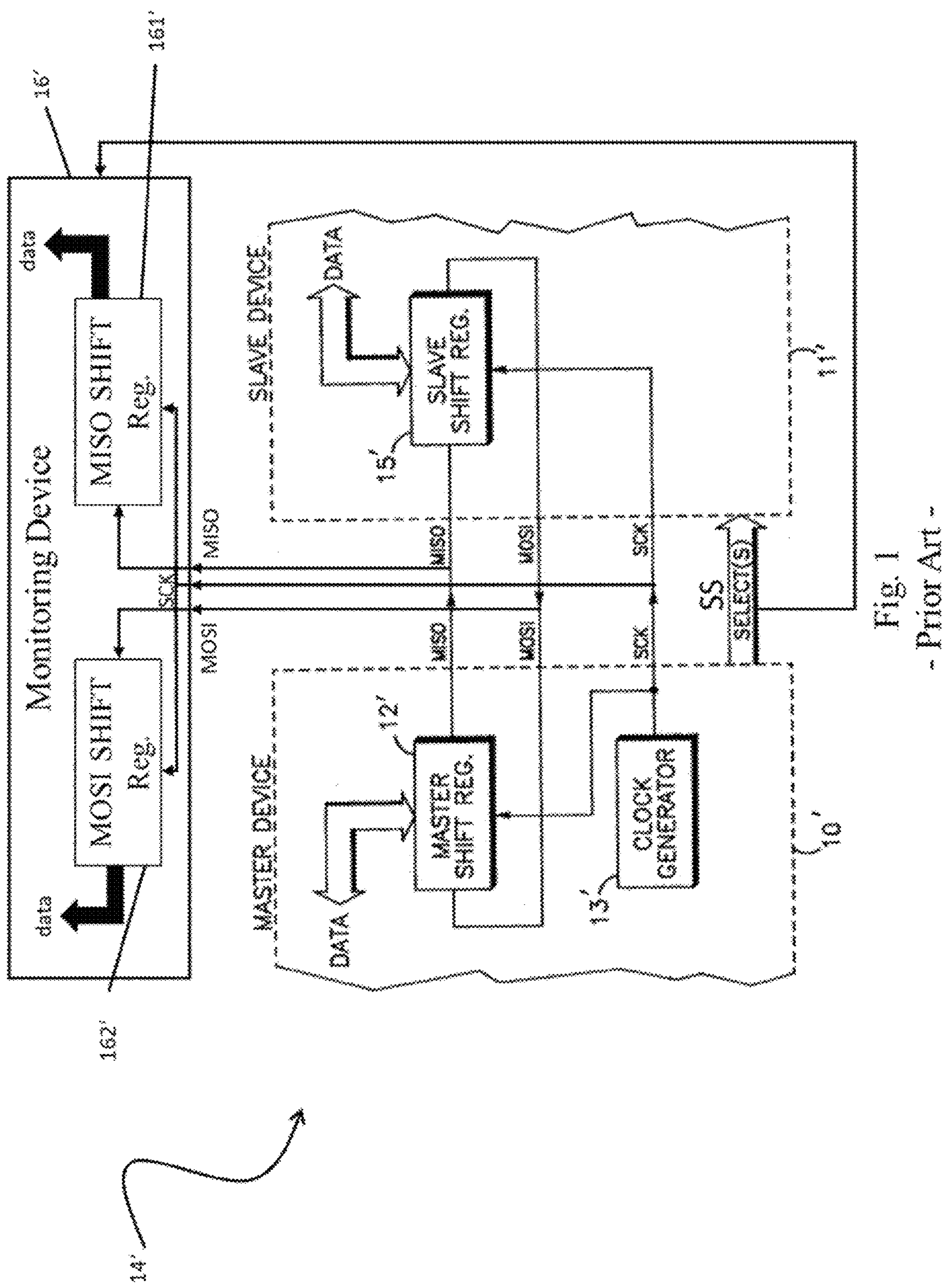
FIG. 1 shows schematically a SPI network comprising a master data processing unit being connected to a slave data processing unit and a monitoring data processing unit according to the state of the art.

In U.S. Pat. No. 4,816,996A a network 14' with a Serial Peripheral Interface (SPI) is shown and described. FIG. 1 illustrates the network 14', wherein the SPI used therein may be described as a synchronous, four-wire serial interface.

A master device/data processing unit 10', such as a microcomputer (MCU) or System on a Chip (SoC), and a slave device/data processing 11', such as an analog-to-digital converter or similar peripheral or System on a Chip (SoC), communicate by means of their respective SPI interfaces.

At the master device 10', the SPI interface comprises a master shift register 12' and a clock generator 13'. A least significant bit of the shift register 12' has an input connected to a pin labeled MISO (master in/slave out or master-in-slave-out) and a most significant bit of the shift register 12' has an output connected to a pin labeled MOSI (master out/slave in or master-out-slave-in) of the master device 10'. An output of the clock generator 13' is connected to a clock input of the shift register 12' of the master device 10 and to a pin labeled SCK (for slave clock) of the master device 10'.

The SPI interface of the slave device 11' (there may be more than one slave device 11' coupled to a single master device 10') comprises a slave shift register 15'. A least significant bit of the slave shift register 15' has an input connected to a pin labeled MOSI and a most significant bit of the shift register 15' has an output connected to a pin labeled MISO of the slave device 11'. A clock input of the slave shift register 15' is connected to a pin labeled SCK of the slave device 11' which is connected to the pin labelled SCK of the master device 10'.

The respective MOSI, MISO and SCK pins of the master device 10' and the slave device 11' are connected to one another. In addition, one or more slave/chip select lines SS for transmitting one or more chip select signals from the master device 10' to the slave device 11' are provided to enable selecting of the (respective) slave device 11'. Both, the master device 10' and the slave device 11', have a data path for entering data to be transmitted into and retrieving received data from their respective shift registers 12', 15'.

Moreover, a monitoring device 16', optionally a SoC, is provided wherein the monitoring device 16' also comprises the above described SPI interface of the slave device 11' including a MOSI, MISO and SCK port/pin connected to the MOSI, MISO and SCK ports of the master and the slave device 10', 11' as well as a shift register 161' for the MOSI data line and a shift register 162' for the MSIO data line both connected to the SCK port of the master device 10'. The monitoring device 16' is also connected to the chip select line labelled by SS of the respective slave device 11'. The monitoring device 16' carries out alive monitoring of the master and the slave device 10', 11' using the SPI interface, i.e., checks if data is exchanged between the master and the slave device 10', 11' regularly and/or if the exchanged data is correct and/or plausible.

The primary drawback of the SPI interface as described above when used in alive monitoring is that it requires a relatively high number of pins/ports at the monitoring device 16', i.e., at least three but up to four or more pins, to carry out alive monitoring for a single slave device 11'.

Figure 2:
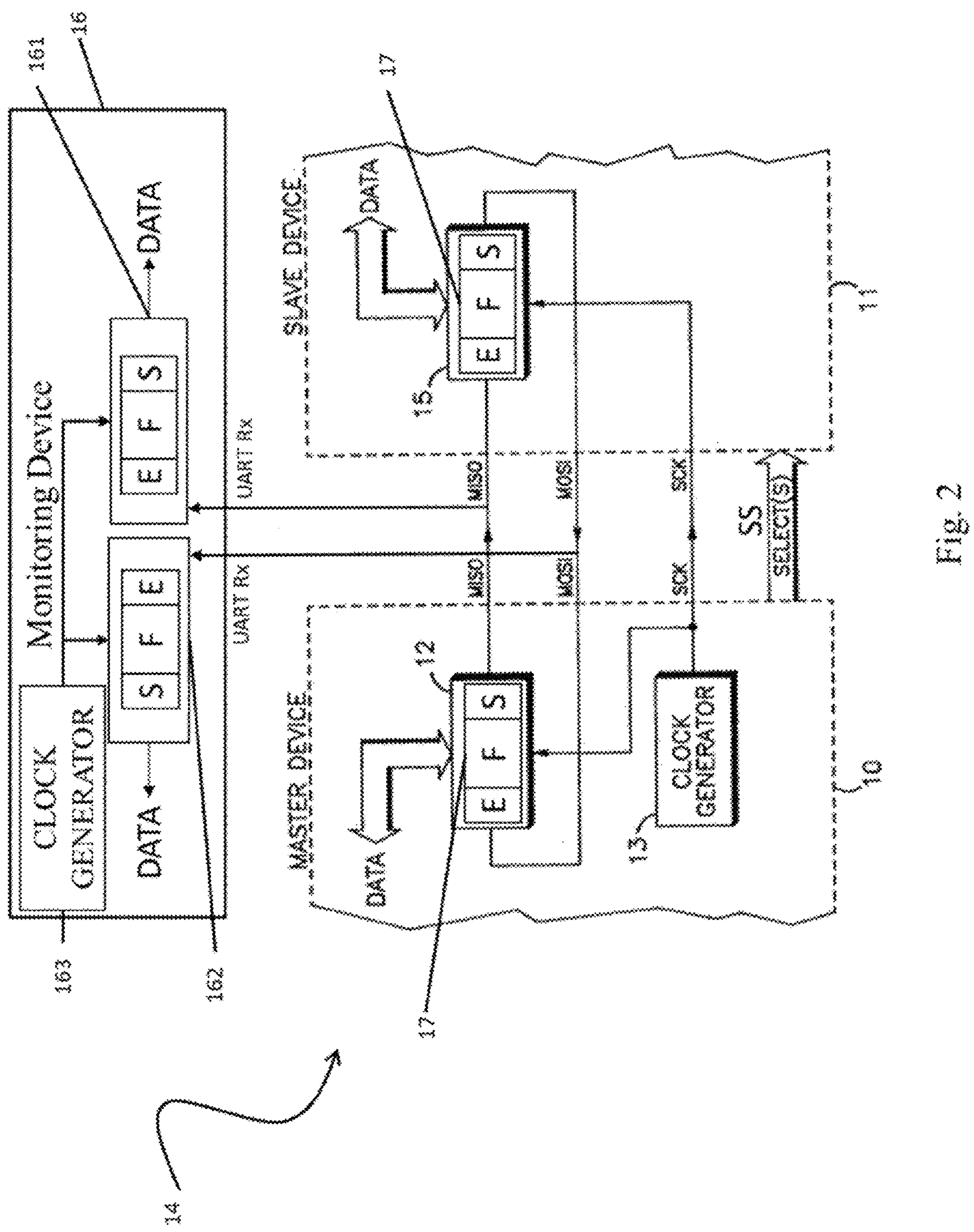
FIG. 2 shows schematically a communication network comprising a master data processing unit being connected to a slave data processing unit and a monitoring data processing unit according to the disclosure.

Therefore, a novel communication method for a communication network 14 of a (not shown) vehicle is provided, as can be gathered form FIGS. 2 to 4, wherein FIG. 2 shows the communication network 14 schematically, FIG. 3 shows schematically a data packet exchanged in the network 14 of FIG. 2 using the method shown in FIG. 4. The network also comprises a master device 10, a slave device 11 and a monitoring device 16 like the network 14' of FIG. 1, wherein the corresponding parts of the network 14 are indicated by the same references as in the network 14' FIG. 1 but without the apostrophe. The description given above with respect to FIG. 1 is also correct for the network 14 shown in FIG. 2 unless stated otherwise.

The network 14 comprises a master data processing unit 10 and a slave data processing unit 11 being connected to the master data processing unit 10 via its SPI.

More specifically, the slave data processing unit 11 is connected to the master data processing unit via a slave select line labelled by SS for indicating that data will be sent from the master data processing unit 10 to the slave data processing unit 11, a serial clock line labelled by SCK for synchronizing a sampling time of the master data processing unit 10 and a sampling time of the slave data processing unit 11, a master-out-slave-in data line labelled by MOSI for data output from the master data processing unit 10 to the slave data processing unit 11, and a master-in-slave-out data line labelled by MISO for data output from the slave data processing unit 11 to the master data processing unit 10.

The network 14 comprises a monitoring device/data processing unit 16 being connected to the master data processing unit 10 and to the slave data processing unit 11. Therefore, the monitoring data processing unit 16 comprises an asynchronous serial communication interface.

More specifically, the asynchronous serial communication interface of the monitoring device 16 comprises two input ports labelled by UART Rx, respectively, and two shift registers 161, 162 connected at an input side thereof to one of the input ports of the monitoring device 16, respectively. One of the input ports labelled by UART Rx is connected to the master-out-slave-in data line labelled by MOSI and the other one of the input ports labelled UART Rx is connected to the master-in-slave-out data line labelled by MISO. Via the two input ports data sent from the master device 10 to the slave device 11 (via MOSI) and form the slave device 11 to the master device 10 (via MISO) is received at the monitoring device 16 and written into the respective one of the shift registers 161, 162 of the monitoring device 16. The asynchronous serial communication interface of the monitoring device 16 also comprises a clock generator 163 (similar to the clock generator 13 of the master device 10) connected to a respective clock input of both shift registers 161, 162 of the monitoring device 16. Both shift registers 161, 162 of the monitoring device 16 have a data path for retrieving received data from the respective shift register 161, 162.

The above-described network 14 is used in carrying out the method of FIG. 4 as follows:

In a first step S1 of the method, the master device 10 indicates the start of a communication cycle including sending data from the master device 10 to the slave device 11 and vice versa using the slave select line labelled by SS, e.g., by pulling the slave select line labelled by SS from the idle/high state (i.e., 1) to the low state (i.e., 0).

In a second step S2 of the method, the master and the slave device 10, 11 start sending a data packet 17 (optionally pre-) loaded into their respective shift register 12, 15 via the master-out-slave-in data line labelled by MOSI and the master-in-slave-out data line labelled by MISO (so-called duplex communication mode). More specifically, in the second step S2 sending the data from the master data processing unit 10 to the slave data processing unit 11 is done using the master-out-slave-in data line labelled by MOSI and sending data from the slave data processing unit 11 to the master data processing unit 10 is done using the master-in-slave-out data line labelled by MISO.

The data packet 17 is shown in detail in FIG. 3 and comprises a start bit labelled by S (e.g., low/zero) and a stop bit (e.g., high/one) labelled by E framing/accommodating in-between a data byte labelled with F comprising eight data bits labelled with F1-F8 (there might be more or less than eight data bits, but the data packet should contain a fixed/predefined number of data bits). That is, the data (packet) 17 sent from the master data processing unit 10 to the slave data processing unit 11 and the data (packet) 17 sent from the slave data processing unit 11 to the master data processing unit 10 is framed by the start bit labelled by S as a first bit and the stop bit labelled with E as a last bit of the sent data (packet) 17.

The master device 10 and the slave device 11 send the bits of the data packet 17 one by one starting with the start bit labelled by S, followed by the data bits labelled by F1-F8, and at the end the stop bit labelled with E.

Both, the shift register 12 of the master device 10 and the shift register 15 of the slave device 11, receive the same clock signal from the clock generator 13 of the master device 10 via the serial clock line labelled by SCK at least during sending and receiving the data packet 17 in the second step S2 of the method. That is, by using the same clock signal, the sampling time of the master device 10 and the sampling time of the slave device 10 are synchronized to each other.

More specifically, to begin the communication in the second step S2, the bus device 10 configures its clock generator 13, using a frequency supported by the slave device 11, typically up to a few MHz, and by the monitoring device 16. Here, a predefined frequency may be used. The master device 10 then selects the slave device 11 with a logic level 0 on the select line labelled by SS. If a waiting period is required, such as for an analog-to-digital conversion, the master device 10 waits for at least that period of time before issuing clock cycles using its clock generator 13 and the serial clock line labelled by SCK.

During each SPI clock cycle, a full-duplex data transmission occurs. The master device 10 sends a bit on the master-out-slave-in data line labelled by MOSI and the slave device 11 reads it, while the slave device 11 sends a bit on the master-in-slave-out data line labelled by MISO and the master device 10 reads it. This sequence may be maintained even when only one-directional data transfer is intended.

The data transmission between the master and the slave device 10, 11 involves the two shift registers 12, 15 of the master and the slave device 10, 11 both having some given word-size, such as ten bits, one in the master and one in the slave device 10, 11; which are connected in a virtual ring topology by the master-out-slave-in data line labelled by MOSI and the master-in-slave-out data line labelled by MISO. Data is shifted out with the most significant bit first, here the start bit labelled with S. On the clock edge, both, the master and slave device 10, 11, shift out a bit and output it on the respective data (transmission) line (i.e., MISO and MOSI) to the counterpart. On the next clock edge, at each receiver 10, 11 the bit is sampled from the transmission line and set as a new least-significant bit of the respective shift register 12, 15. After all the register bits have been shifted out and in, the master and slave device 10, 11 have exchanged register values. If more data needs to be exchanged, the shift registers 12, 15 are reloaded and the process repeats. Transmission may continue for any number of clock cycles. When complete, the master device 10 stops toggling the clock signal, and typically deselects the slave device 11 using the slave select line labelled by SS.

In addition to setting the clock frequency, the master device 10 also configures a clock polarity and phase with respect to the data. In SPI there are generally two options available, i.e., CPOL and CPHA (for clock polarity and clock phase).

The timing is further described below and applies to both the master and the slave device 10, 11.

CPOL determines the polarity of the clock. The polarities can be converted with an inverter. CPOL=0 is a clock which idles at 0, and each cycle consists of a pulse of 1. That is, the leading edge is a rising edge, and the trailing edge is a falling edge. CPOL=1 is a clock which idles at 1, and each cycle consists of a pulse of 0. That is, the leading edge is a falling edge, and the trailing edge is a rising edge. CPHA determines the timing (i.e., phase) of the data bits relative to the clock pulses. For CPHA=0, the "out" side changes the data on the trailing edge of the preceding clock cycle, while the "in" side captures the data on (or shortly after) the leading edge of the clock cycle. The "out" side holds the data valid until the trailing edge of the current clock cycle. For the first cycle, the first bit must be on the MOSI line before the leading clock edge. An alternative way of considering it is to say that a CPHA=0 cycle consists of a half cycle with the clock idle, followed by a half cycle with the clock asserted. For CPHA=1, the "out" side changes the data on the leading edge of the current clock cycle, while the "in" side captures the data on (or shortly after) the trailing edge of the clock cycle. The "out" side holds the data valid until the leading edge of the following clock cycle. For the last cycle, the slave holds the MISO line valid until slave select is deactivated. An alternative way of considering it is to say that a CPHA=1 cycle consists of a half cycle with the clock asserted, followed by a half cycle with the clock idle. The MOSI and MISO signals are usually stable (at their reception points) for the half cycle until the next clock transition. SPI master and slave devices 10, 11 may well sample data at different points in that half cycle. This adds more flexibility to the communication channel between the master and slave device 10, 11.

However, irrespective which clock polarity and phase is used, the above ensures that the master and the slave device 10, 11 sample the received data signal at the correct point in time, i.e., they use a synchronized sampling time (indicated by the arrows shown in FIG. 3).

The monitoring device 16, which may be considered as a man-in-the-middle device, also receives the bits labelled by S, F1-F8, and E send via the master-in-slave-out data line labelled by MISO and the master-out-slave-in data line labelled by MOSI at its respective input port labelled by UART Rx. Since the monitoring device 16 comprises the UART interface (asynchronous communication interface), the monitoring device 16 is not connected to the serial clock line labelled by SCK and thus does not receive the clock signal from the master device 10. Moreover, the monitoring device 16 does also not receive the slave/chip select signal from the master device 10 because it is not connected to the slave select line labelled by SS.

However, since each data packet send from the master to the slave device 10, 11 and vice versa comprises the start bit labelled by S, the monitoring device 16 can recognize a start of the above-described transmission cycle without getting the chip select signal. The same applies to the end of the transmission cycle which can be recognized by the monitoring device 16 using the stop bit labelled by E. That is, the monitoring device 16 recognizes a beginning of the sent data using the start bit labelled by S and an end of the sent data using the stop bit labelled by E. Thus, in a third step S3 of the method, the monitoring device 16 recognizes the beginning of the data sent from the master data processing unit 10 to the slave data processing unit 11 via the master-out-slave-in data line labelled by MOSI using the start bit labelled by S and the end of the data sent from the master data processing unit 10 to the slave data processing unit 11 via the master-out-slave-in data line labelled by MOSI using the stop bit labeled by E. The monitoring device 16 recognizes the beginning of the data sent from the slave data processing unit 11 to the master data processing unit 10 via the master-in-slave-out data line labelled by MISO using the start bit labelled by S and the end of the data sent from the slave data processing unit 11 to the master data processing unit 10 via the master-in-slave-out data line labelled by MISO using the stop bit labelled by E.

Moreover, the monitoring device 16 samples the data with the same sampling time as the master data processing unit 10 and the slave data processing unit 11 (i.e., samples the received data during the same time slots as the slave data processing unit 11 for the data sent via MOSI and/or samples the received data during the same time slots as the master data processing unit 10 for the data sent via MISO). This is done using the clock generator 163 of the monitoring device 16 which may have the same clock frequency as the clock generator 13 of the master device 10 and optionally by sampling the data at the monitoring device 16 according to a predefined clock polarity and phase used by the master and the slave device 10, 11. Therefore, the monitoring device 16 can not only recognize the start and the end of the transmission cycle but can also correctly read/recognize the data bits labelled by F1-F8 included in each data packet labelled by F.

REFERENCE SIGNS

10' master device (prior art)
11' slave device (prior art)
12' master shift register (prior art)
13 clock generator of master device (prior art)
14' communication network (prior art)
15' slave shift register (prior art)
16' safety/monitoring device (prior art)
161' MISO shift register of monitoring device (prior art)
162' MOSI shift register of monitoring device (prior art)
10 master device
11 slave device
12 master shift register
13 clock generator of master device
14 communication network
15 slave shift register
16 safety/monitoring device
161 MISO shift register of monitoring device
162 MOSI shift register of monitoring device
163 clock generator of monitoring device
17 data packet
MSIO master-in-slave-out data line
MOSI master-out-slave-in data line
SS slave/chip select line
SCK slave clock line
S start bit
E stop bit
F data byte
F1-F8 data bits
S1-S3 steps of the method.

The invention claimed is:

1. A communication method for a communication network of a vehicle, wherein the network comprises:

a master data processing unit, and a slave data processing unit, wherein the master data processing unit and the slave data processing unit are both SPI devices communicatively coupled via a synchronous serial communication interface and via a slave select line for indicating that data is being sent from the master data processing unit to the slave data processing unit, wherein the synchronous serial communication interface connects the master data processing unit and the slave data processing unit via a master-out-slave-in line, a master-in-slave-out line, and a serial clock line, the method comprising:

sending data from the master data processing unit to the slave data processing unit via the master-out-slave-in line and/or from the slave data processing unit to the master data processing unit via the master-in-slave-out line, wherein the sent data is framed by a start bit as a first bit and a stop bit as a last bit.

2. The communication method of claim 1, wherein the serial clock line is for synchronizing a sampling time of the master data processing unit and a sampling time of the slave data processing unit, and the master-out-slave-in data line is for data output from the master data processing unit to the slave data processing unit, the method further comprising:

indicating that the data is being sent from the master data processing unit to the slave data processing unit using the slave select line;

synchronizing the sampling time of the master data processing unit to the sampling time of the slave data processing unit using the serial clock line after and/or during indicating that the data is being sent from the master data processing unit to the slave data processing unit, and sending the data from the master data processing unit to the slave data processing unit using the master-out-slave-in data line after and/or during synchronizing the sampling time of the master data processing unit to the sampling time of the slave data processing unit.

3. The communication method of claim 2, wherein the master-in-slave-out data line is for data output from the slave data processing unit to the master data processing unit, the method further comprising:

sending the data from the slave data processing unit to the master data processing unit using the master-in-slave-out data line after and/or during synchronizing the sampling time of the master data processing unit to the sampling time of the slave data processing unit.

4. The communication method of claim 1, wherein the network comprises: a monitoring data processing unit comprising an asynchronous serial communication interface, wherein the monitoring data processing unit is connected via the asynchronous serial communication interface to the master data processing unit and the slave data processing unit, and wherein the monitoring data processing unit recognizes a beginning of the sent data using the start bit and an end of the sent data using the stop bit.

5. The communication method of claim 4, wherein the monitoring data processing unit is connected to the master-out-slave-in data line, and wherein the monitoring data processing unit recognizes the beginning of the data sent from the master data processing unit to the slave data processing unit via the master-out-slave-in data line using the start bit and the end of the data sent from the master data processing unit to the slave data processing unit via the master-out-slave-in data line using the stop bit.

6. The communication method of claim 4, wherein the monitoring data processing unit is connected to the master-in-slave-out data line, and wherein the monitoring data processing unit recognizes the beginning of the data sent from the slave data processing unit to the master data processing unit via the master-in-slave-out data line using the start bit and the end of the data sent from the slave data processing unit to the master data processing unit via the master-in-slave-out data line using the stop bit.

7. The communication method of claim 4, wherein the monitoring data processing unit samples the received data with the same sampling time as the master data processing unit and the slave data processing unit.

8. A communication network for a vehicle, comprising:

a master data processing unit; and a slave data processing unit, wherein the master data processing unit and the slave data processing unit are both SPI devices communicatively coupled via a synchronous serial communication interface and via a slave select line for indicating that data is being sent from the master data processing unit to the slave data processing unit, wherein the synchronous serial communication interface connects the master data processing unit and the slave data processing unit via a master-out-slave-in line, a master-in-slave-out line, and a serial clock line, and wherein the master data processing unit is configured to frame the data sent from the master data processing unit to the slave data processing unit with a start bit as a first bit and a stop bit as a last bit of the sent data, and/or the slave data processing unit is configured to frame the data sent from the slave data processing unit to the master data processing unit with a start bit as a first bit and a stop bit as a last bit of the sent data.

9. The communication network of claim 8, wherein the serial clock line is for synchronizing a sampling time of the master data processing unit and a sampling time of the slave data processing unit, and the master-out-slave-in data line is for data output from the master data processing unit to the slave data processing unit, wherein the master data processing unit is configured to indicate that the data is being sent from the master data processing unit to the slave data processing unit using the slave select line, wherein the master data processing unit is configured to synchronize the sampling time of the master data processing unit to the sampling time of the slave data processing unit using the serial clock line after and/or during indicating that the data is being sent from the master data processing unit to the slave data processing unit, and wherein the master data processing unit is configured to send the data from the master data processing unit to the slave data processing unit using the master-out-slave-in data line after and/or during synchronizing the sampling time of the master data processing unit to the sampling time of the slave data processing unit.

10. The communication network of claim 9, wherein the master-in-slave-out data line is for data output from the slave data processing unit to the master data processing unit, and wherein the slave data processing unit is configured to send data from the slave data processing unit to the master data processing unit using the master-in-slave-out data line after and/or during synchronizing the sampling time of the master data processing unit to the sampling time of the slave data processing unit.

11. The communication network of claim 8, wherein the network comprises: a monitoring data processing unit comprising an asynchronous serial communication interface, wherein the monitoring data processing unit is connected via the asynchronous serial communication interface to the master data processing unit and the slave data processing unit, and wherein the monitoring data processing unit is configured to recognize a beginning of the sent data using the start bit and an end of the sent data using the stop bit.

12. The communication network of claim 11, wherein the monitoring data processing unit is connected to the master-out-slave-in data line, and wherein the monitoring data processing unit is configured to recognize the beginning of the data sent from the master data processing unit to the slave data processing unit via the master-out-slave-in data line using the start bit and the end of the data sent from the master data processing unit to the slave data processing unit via the master-out-slave-in data line using the stop bit.

13. The communication network of claim 11, wherein the monitoring data processing unit is connected to the master-in-slave-out data line, and wherein the monitoring data processing unit is configured to recognize the beginning of the data sent from the slave data processing unit to the master data processing unit via the master-in-slave-out data line using the start bit and the end of the data sent from the slave data processing unit to the master data processing unit via the master-in-slave-out data line using the stop bit.

14. The communication network of claim 11, wherein the monitoring data processing unit is configured to sample the received data with the same sampling time as the master data processing unit and the slave data processing unit.

15. A vehicle, comprising:

the communication network of claim 8.

* * * * *